United States Patent [19]
Franklin et al.

[11] Patent Number: 5,852,436
[45] Date of Patent: *Dec. 22, 1998

[54] NOTES FACILITY FOR RECEIVING NOTES WHILE THE COMPUTER SYSTEM IS IN A SCREEN MODE

[75] Inventors: David C. Franklin; Dean J. Hachamovitch, both of Seattle; William J. Bliss, Woodinville; David C. Tuniman, Redmond, all of Wash.

[73] Assignee: Microsoft Corporation, Redmond, Wash.

[*] Notice: This patent issued on a continued prosecution application filed under 37 CFR 1.53(d), and is subject to the twenty year patent term provisions of 35 U.S.C. 154(a)(2).

[21] Appl. No.: 803,187

[22] Filed: Feb. 18, 1997

Related U.S. Application Data

[63] Continuation of Ser. No. 269,378, Jun. 30, 1994, abandoned.

[51] Int. Cl.[6] .................................................. G06F 3/14
[52] U.S. Cl. .................................. 345/326; 707/512
[58] Field of Search ................................ 395/135, 335,
395/339, 348, 350, 773, 761, 792, 346;
707/512, 500, 530; 345/113, 114, 118, 119,
145, 435, 335, 339, 348, 350, 346, 329–332,
326

[56] References Cited

U.S. PATENT DOCUMENTS

| | | | |
|---|---|---|---|
| 5,165,012 | 11/1992 | Crandall et al. .......................... | 395/347 |
| 5,231,578 | 7/1993 | Levin et al. ............................... | 395/773 |
| 5,237,651 | 8/1993 | Randall .................................... | 395/350 |
| 5,341,293 | 8/1994 | Vertelney et al. ....................... | 395/792 |
| 5,367,623 | 11/1994 | Iwai et al. ................................ | 395/350 |
| 5,398,310 | 3/1995 | Tchao et al. ............................. | 395/804 |
| 5,404,442 | 4/1995 | Foster et al. ............................. | 395/348 |
| 5,438,660 | 8/1995 | Lee et al. ................................. | 395/345 |
| 5,475,805 | 12/1995 | Murata .................................... | 395/774 |
| 5,488,686 | 1/1996 | Murphy et al. .......................... | 345/330 |
| 5,524,193 | 6/1996 | Covington et al. ...................... | 395/773 |
| 5,550,968 | 8/1996 | Miller et al. ............................. | 345/332 |
| 5,559,942 | 9/1996 | Gough et al. ............................ | 395/349 |
| 5,563,996 | 10/1996 | Tchao ...................................... | 395/783 |
| 5,581,681 | 12/1996 | Tchao et al. ............................. | 395/761 |
| 5,590,256 | 12/1996 | Tchao et al. ............................. | 395/787 |
| 5,596,700 | 1/1997 | Darnell et al. ........................... | 395/340 |
| 5,689,666 | 11/1997 | Berquist et al. ......................... | 345/345 |
| 5,740,549 | 4/1998 | Reilly et al. ............................. | 705/14 |

OTHER PUBLICATIONS

Phillips, "MediaView a General Multimedia Digital Publication System" Communications of the ACM, vol. 34, No. 7, Jul. 1991, pp. 75–83.

Cowart, "Mastering Windows™ 3.1 Special Edition", Sybex Inc. 1993, pp. 167,168, 170, 174–175.

"Electronic Posted Notes", IBM Technical Disclosure Bulletin, vol. 37, No. 1, Jan. 1994, pp. 121–122.

"Evergreen Notes for Windows User Guide", Evergreen International Technology Inc., 1994, pp. 1–31.

Phillips, Richard L., "Media View: An Editable Multimedia Publishing System Developed with an Object–Oriented Toolkit," USENIX–Summer '91—Nashville, TN; pp. 125–136.

(List continued on next page.)

*Primary Examiner*—Matthew M. Kim
*Assistant Examiner*—Crescelle N dela Torre
*Attorney, Agent, or Firm*—Jones & Askew, LLP

[57] ABSTRACT

A screen saver program is provided within a computer system. The screen saver program includes a note facility for generating notes. The notes facility includes a note-taker interface. The screen saver program is run on the computer system and in response to receiving input from a user, the note-taker interface is displayed on a video display of the computer system. In response to input by the user via the note-taker interface, a note is created. Subsequently, the screen saver program is dismissed and the note is displayed on the video display when the screen saver is dismissed.

6 Claims, 14 Drawing Sheets

OTHER PUBLICATIONS

Sperry, "Zoomracks II," *BYTE* 12(6):272, 1987.

McWilliams, "On Computers: Organize Your Stray Thoughts," *The Record* (*Northern New Jersey*), p. d05, Jul. 6, 1987.

Gibson, "You Can Do Anything But Don't Take Away Tornado Notes," *InfoWorld*, p. 28, Aug. 27, 1990.

Caruso, "Inside Technology: Two sides to the software patent issue," *San Francisco Examiner*, p. D–15, Mar. 10, 1991.

Sullivan, "Microsoft 'Solutions' Wield Ole Power," *PC Week*, p. 33, Oct. 7, 1991.

Zucker, "Review of: WinPost Rel. 3.1, Sticky notes for Windows", *Newsbytes News Network*, May 8, 1992.

Powell, "One Small Step Toward the Paperless Office," *Windows Magazine 309*:241,1992.

*Folio VIEWS, Personal Electronic Publishing Software, User's Guide, Version 3.0, For the Windows Graphical Environment*, Folio Corporation, Provo, UT, 1993, pp. 314–319, 392–393, 413.

Salemi, "Phone Message—Taking Made Easy," *PC Magazine*, p. 30, Sep. 13, 1994.

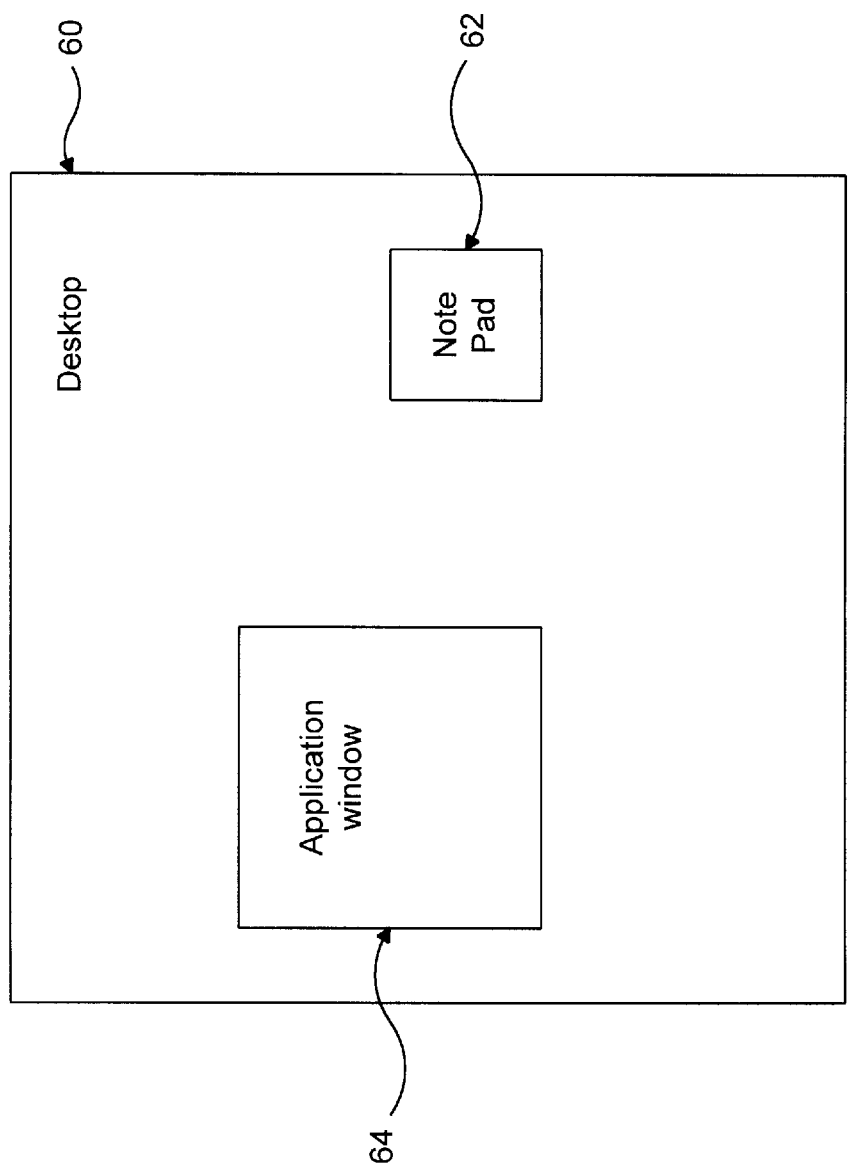

NOTES FACILITY FOR RECEIVING NOTES WHILE THE COMPUTER SYSTEM IS IN A SCREEN MODE

CROSS-REFERENCE TO RELATED APPLICATION

This application is a continuation of U.S. patent application Ser. No. 08/269,378, filed Jun. 30, 1994, now abandoned.

TECHNICAL FIELD

The present invention relates generally to data processing systems and, more particularly, to the use of moveable electronic notes within data processing systems.

BACKGROUND OF THE INVENTION

The recent advent of paper notes with adhesive backing has enhanced the utility of paper notes by making it possible to affix the notes to objects, such as documents, without the need for staples or paper clips. The adhesive backing has also allowed the notes to be readily affixed to any location on the objects and has enabled the notes to be easily moved to new locations on the object or on other objects without damaging the objects. Various conventional software packages provide annotation or notes-taking facilities. Unfortunately, the electronic notes provided by these facilities do not exhibit all the desirable characteristics of paper notes with adhesive backing.

SUMMARY OF THE INVENTION

In accordance with the first aspect of the present invention, a method is practiced in a computer system. The method includes the step of providing a notes facility for generating notes. A plurality of application programs of different types are provided to be run on the computer system. Each application program has an associated window or icon. A note is generated with the notes facility, and the note is moved from the note facility to an associated window or icon for a first of the application programs. The note may then later be moved to a new location within the associated window or icon or to another associated window or icon for a different application program. In addition, the application programs may be container objects into which the notes are embedded.

In accordance with another aspect of the present invention, a notes server object is provided in a computer system to generate notes objects. At least one application program is provided within the computer system. The application program is a container object for containing other objects. A first note object is generated with the note server object, and this first note object is embedded in the application program container object.

In accordance with a further aspect of the present invention, a computer system includes a note generator for generating a note and an application engine for running application programs. Each application program is associated user interface element. A note transfer facility is provided for transferring the note to the user interface element of the first of the application programs so that the note becomes associated (e.g., embedded), with the first application program.

In accordance with a still further aspect of the present invention, a systems note facility is provided for generating note objects within a computer system. A word processing program is provided for editing a document. A note object is generated with the system note facility and embedded in the document that is edited by the word processing program.

In accordance with the final aspect of the present invention, a screen saver program is provided within the computer system. The screen saver program includes a note facility for generating notes. The notes facility includes a note-taker interface. The screen saver program is run on the computer system and in response to receiving input from a user, the note-taker interface is displayed on a video display of the computer system. In response to input by the user via the note-taker interface, a note is created. Subsequently, the screen saver program is dismissed and the note is displayed on the video display when the screen saver is dismissed.

BRIEF DESCRIPTION OF THE DRAWINGS

FIG. 5 illustrates an example of objects that play a role in an illustrated drag and drop operation in accordance with the preferred embodiment of the present invention.

DETAILED DESCRIPTION OF THE INVENTION

The preferred embodiment of the present invention provides a central notes facility for creating and managing the electronic equivalents of conventional paper notes with adhesive backing. In particular, the preferred embodiment of the present invention provides a central notes facility for generating and managing notes that may be attached to objects throughout a data processing system. The central notes facility may be part of an operating system, a separate system resource or an independent application. The central notes facility may be accessed from within different applications. The note objects generated by the central notes facility are moveable in that the objects to which they are attached may be changed (i.e., they are not permanently bound to a given object). The note objects that are generated and managed by the central notes facility may contain different types of data (e.g., text, bitmaps, etc.), and the contents of the note objects may be readily edited.

Figure 1:
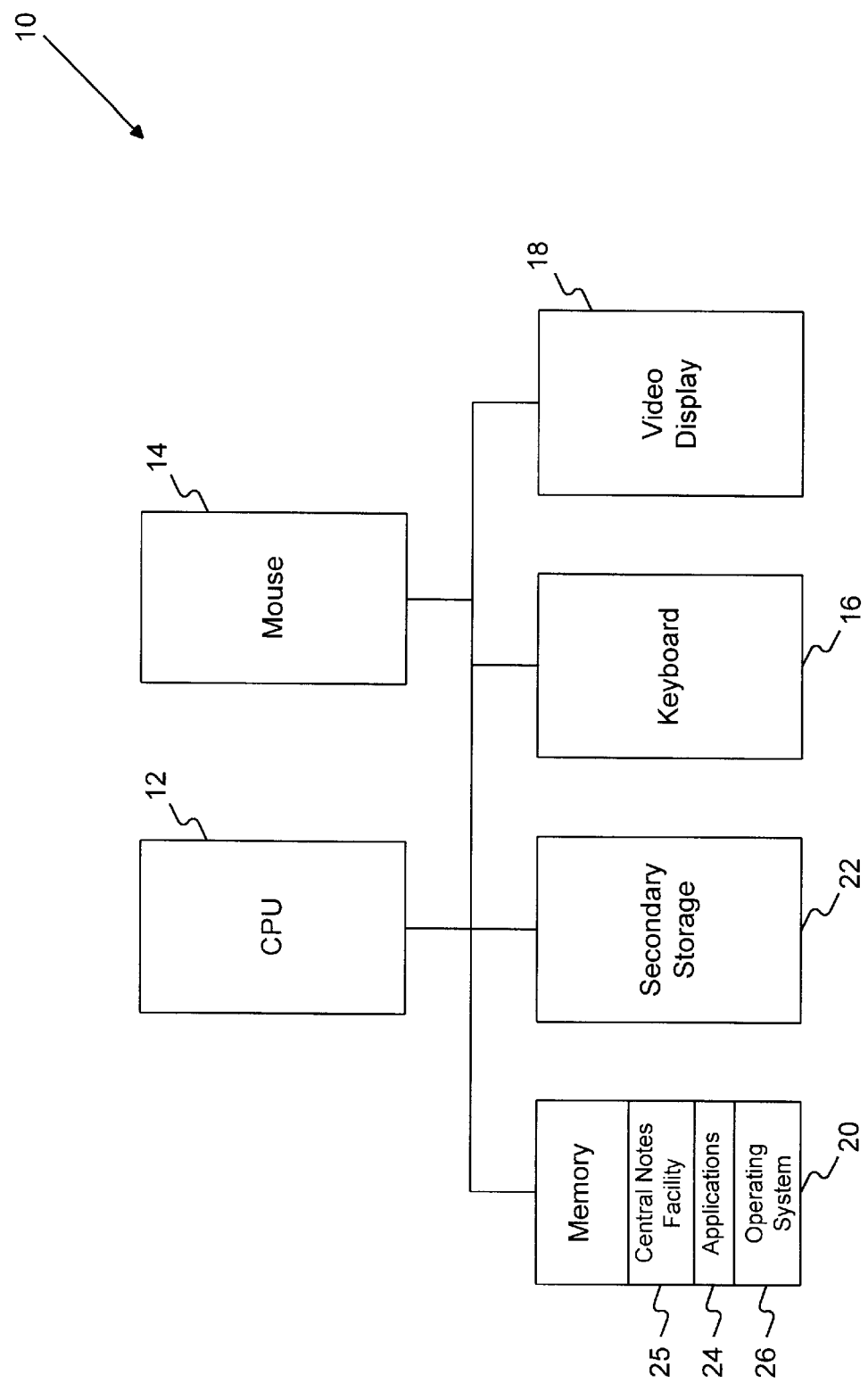
FIG. 1 is a block diagram of a data processing system that is suitable for practicing a preferred embodiment of the present invention.

FIG. 1 is a block diagram of a data processing system 10 that is suitable for practicing the preferred embodiment of the present invention. The data processing system 10 includes a central processing unit (CPU) 12, such as a microprocessor, for overseeing the activities of the data processing system 10. The data processing system also includes input devices, such as mouse 14 and keyboard 16. A video display 18 is provided to output video data and is the primary vehicle for displaying a user interface to the user. The data processing system 10 further includes storage in the form of memory 20 and secondary storage device 22. The memory 20 may include random access memory (RAM), read-only memory (ROM), electronically programmable read-only memory (EPROM), electronically erasable programmable read-only memory (EEPROM) or other type of suitable memory. The memory 20 holds an application programs 24, the central notes facility 25 and an operating system 26. In the preferred embodiment of the present invention, the operating system 26 is an embellished version of the "MICROSOFT WINDOWS, " Version 3.1, operating system. The secondary storage 22 may be hard disk or other suitable secondary storage device.

The preferred embodiment of the present invention is employed using the Microsoft Object Linking and Embedding (OLE) 2.0 protocol of Microsoft Corporation of Redmond, Wash. In order to understand the implementation details of the preferred embodiment, it is helpful to review some of the concepts employed in Microsoft OLE 2.0.

Microsoft OLE 2.0 is protocol that follows a particular object model. An "object," in Microsoft OLE 2.0, is a data abstraction for encapsulating related behavior and attributes. Typically, an object includes a number of functions and data structures. Nevertheless, it should be appreciated that an object may, in some instances, include only functions. A "container" is an object for containing other objects.

An "interface" is a group of semantically related functions that are organized into a named unit (the name being the identifier of the interface). Interfaces have no instantiation (i.e., the definition for an interface does not include code for implementing the functions that are identified in the interface); rather, interfaces specify a set of signatures for functions. "Instantiation" refers to the process of creating in-memory structures that represent an object so that operations can be invoked in the object. When an object supports an interface, the object provides code for the function specified by the interface. Thus, the object that supports the interface is responsible for providing the code for implementing the functions of the interface. The provided code must comply with the signatures of the functions that are specified by the interface. The run-time manifestation of an interface instance is a data structure that provides access to the functions defined for the interface. Interface instances are referenced by clients of an object using interface pointers. Thus, when a client is provided with an interface pointer, the client is then able to invoke the functions of the instance of the interface that is provided by the server.

Microsoft OLE 2.0 provides a component object model with which objects must comply in order to be considered component objects. The component object model is implemented as a library of fundamental application program interface (API) functions that provide for object creation and management and also provide the marshalling of interface function calls across process boundaries. As will be described in more detail below, notes generated with central notes facility 25 of the preferred embodiment of the present invention are component objects that comply with the component object model of Microsoft OLE 2.0.

Microsoft OLE 2.0 also specifies the notion of a server object. In order for an object to be considered a server object, it must implement the IOleObject Interface, the IDataObject interface, the IPersistStorage interface and the IClassFactory interface. The IDataObject is an interface supported by data objects to facilitate data transfer. The IPersistStorage interface includes functions for handling the persistent storage of objects. The IClassFactory interface includes functions for generating objects of a given class, and the IOleObject interface holds an assortment of functions that are useful for manipulating objects. These interfaces are all defined within the Microsoft OLE 2.0 protocol. More information about these interfaces may be found in Kraig Brockschmidt, *Inside OLE* 2.0, Microsoft Press, 1994. The notion of a server object is relevant to the present discussion because the central notes facility 25 provided by the preferred embodiment of the present invention is a server, as defined above.

Microsoft OLE 2.0 supports the creation of "compound documents." A compound document is a document that serves as a gathering point for data from different external sources. For example, a word processing document that contains a spreadsheet from a spreadsheet program is a compound document. Microsoft OLE 2.0 provides two mechanisms for creating compound documents: linking and embedding. Linking provides a link between a source of data that is to be included within a compound document and the location within the compound document itself. Embedding, in contrast, involves embedding the object that encapsulates the data within a container object.

Although the preferred embodiment of the present invention is implemented using the Microsoft OLE 2.0 protocol, those skilled in the art will appreciate that the present invention may be implemented in alternative ways. Furthermore, the present invention need not be implemented in an object-oriented environment, but may instead be implemented in non-object-oriented environments.

The central notes facility 25 of the preferred embodiment of the present invention is implemented as a Microsoft OLE 2.0 server object. This server object is capable of generating note objects of a notes object class. Microsoft OLE 2.0, like other object-oriented environments, supports the notion of object classes that group together objects having similar properties and common behavior. The notes object class groups together all note objects. The note objects encapsulate the information that is incorporated within a note and capture the appearance of the note. These note objects may be attached to other objects. The granularity of data to which a note object is attached may vary. For instance, a note object may be attached to an entire document, a page of a document, a paragraph of a document or a point within a sentence of a document. The granularity to which the note object is attached is the responsibility of an application that provides the container object to which the note object is attached.

In the preferred embodiment of the present invention, note objects are embedded within the container objects to which they are logically attached. Alternatively, the note objects may be linked into the container object. When an object is embedded within the container object, the data within the embedded object is contained within the container object. In contrast, when an object is linked into a container object, the data for the linked object is maintained externally from the container object. The Microsoft OLE 2.0 protocol provides a vehicle for storing a link that allows the externally stored data to be accessed when needed.

The central notes facility 25 of the preferred embodiment provides a single facility which multiple applications may use to generate and manage note objects. Thus, multiple applications may use this single central notes facility 25 to create and manipulate note objects. The discussion below will elaborate on the different activities that may be performed relative to note objects and how a user performs such activities.

Figure 2:
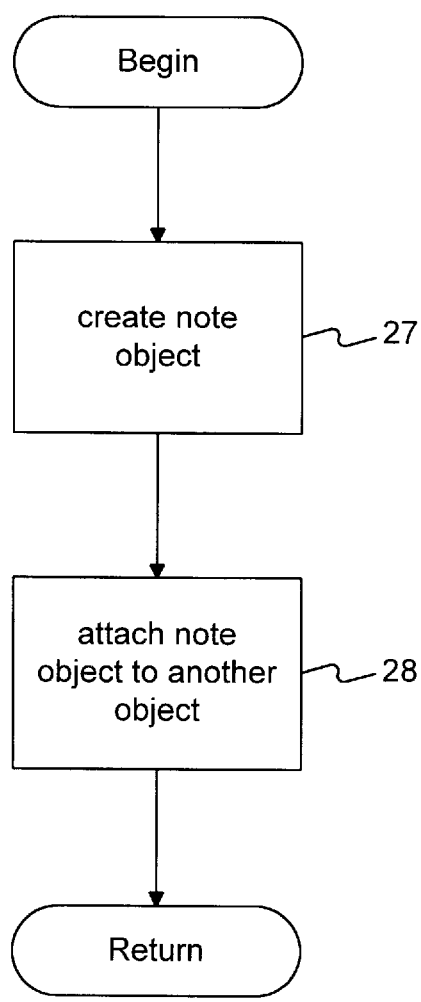
FIG. 2 is a flowchart illustrating basic operations that may be performed with a note object in accordance with the preferred embodiment of the present invention.

FIG. 2 is a flowchart that shows some of the most basic operations that may be performed with a note object. Initially, a user or program requests the creation of a note object and the note object is created using the central notes facility 25 (step 27). Once the note object is created, it may be attached to another object, such as a document, the virtual desktop user interface or other object within the data processing system 10 (step 28). In order to understand these basic operations more thoroughly, each will be discussed separately in more detail below.

Figure 3:
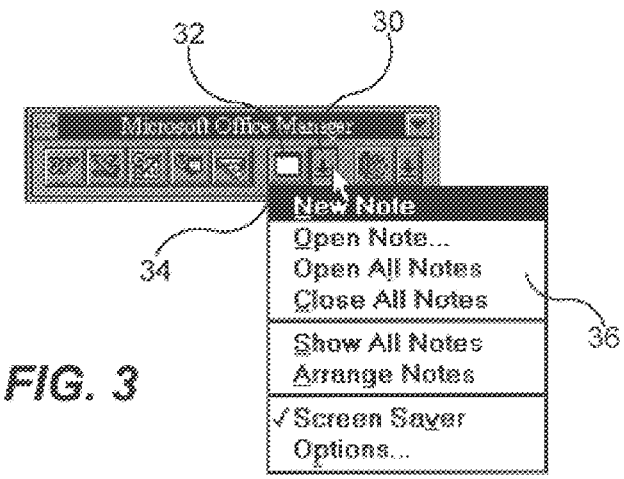
FIG. 3 illustrates the user interface for creating a new note object in accordance with the preferred embodiment of the present invention.

A note object is created by the central notes facility in response to requests by a user or program. Programs, such as application programs 24 or the operating system 20, may provide user interface elements to allow a user to request the creation of a new note object. FIG. 3 shows an example of such a user interface element. In the example shown in FIG. 3, a button 32 is provided on a toolbar to allow a user to request a creation of a new note object. Specifically, activating button 32 causes a new note object to be produced. A user may also generate a new note by activating drop down menu 36 via button 30. Drop down menu 36 includes a "New Note" option 34 for creating a new note object. The user or program requesting the generation of a new note object is generally responsible for providing the contents of the object. In some instances, preformatted note objects may be generated that already have certain predetermined contents when created. The preformatted note objects will be discussed in more detail below.

Programmatically, a note object is created by generating a request to generate a new note object that is sent to the central notes facility 25. Since the central notes facility is a Microsoft OLE server, it supports the IClassFactory interface. This interface includes functions for creating an instance of an object of a given class. The central notes facility 25 generates a note object that is of the notes object class. This object is created to have the contents requested by the user or program.

Figure 4A:
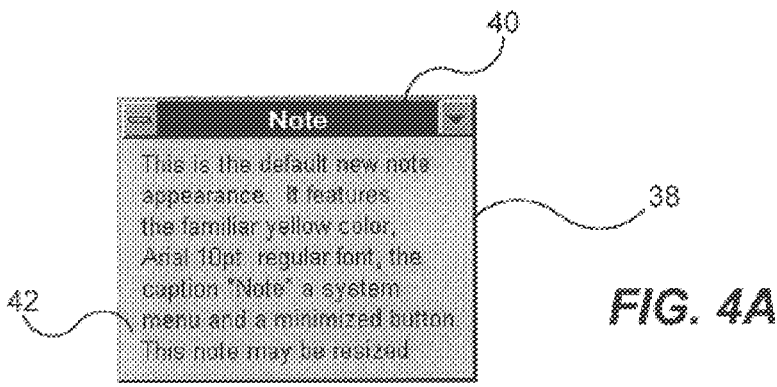
FIG. 4A shows the basic appearance of a note window in accordance with the preferred embodiment of the present invention.

To a user, a newly created note object initially appears as a note window 38, as shown in FIG. 4A. The note window 38 includes a title bar 40 (designating the window as a note window) and a client area 42. When the note object is first created, the client area 42 of the note, unless it is a preformatted note, appears empty, and the user may enter text or other information into the client area to fill in the contents of the note object. Contents may also be added to the note window by copying and pasting information from the clipboard or dragging and dropping information within the client area 42.

Figure 4B:
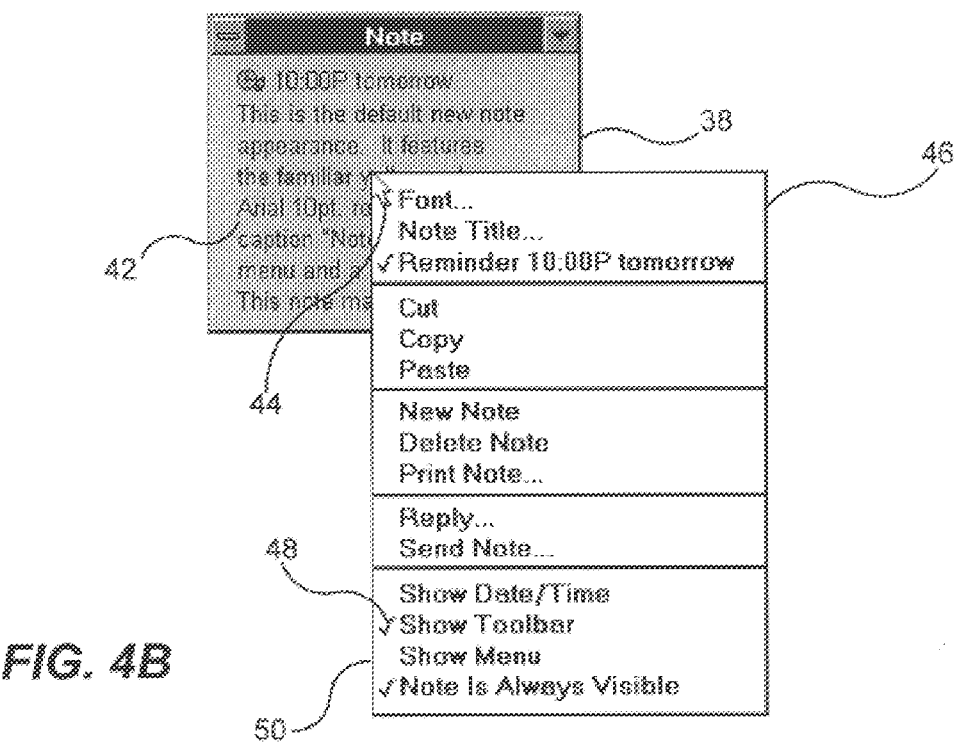
FIG. 4B illustrates a context menu for a note window in accordance with the preferred embodiment of the present invention.
Figure 4C:
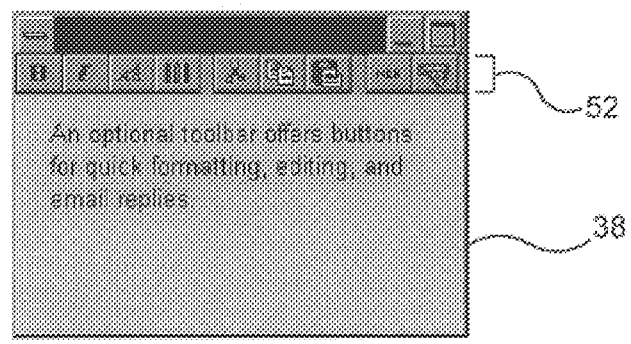
FIG. 4C illustrates a note window with an optional toolbar in accordance with the preferred embodiment of the present invention.
Figure 4D:
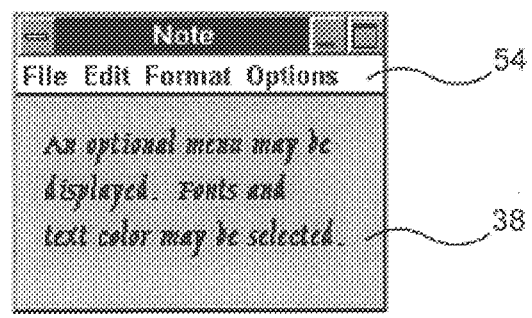
FIG. 4D illustrates a note window with an optional menu bar in accordance with the preferred embodiment of the present invention.

The appearance of the note window 38 may be changed by invoking a context menu 46 (FIG. 4B). The context menu 46 is invoked by positioning the mouse cursor 44 to point within the client area 42 of the note window 38 and then clicking the mouse. As can be seen in FIG. 4B, the context menu 46 includes an option 48 for showing a toolbar and an option 50 for showing a menu. FIG. 4C shows an instance wherein the optional toolbar 52 has been selected for display. The toolbar 52 holds buttons that affect the fonts, formatting and perform other functions relative to the note object. FIG. 4D shows the note window when the optional menu 54 has been displayed.

Those skilled in the art will appreciate that the above-described features regarding the appearance of the note windows are intended merely to be illustrative. The present invention is not limited to the appearances described above. The above discussion has focused on the creation of note objects. The discussion will now shift its focuses to attaching note objects to other objects.

One way to attach a note object to another object is to drag a representation of a note object to a representation of the other object and to drop the representation of the note object on the representation of the other object. In order to appreciate how the drag-and-drop operation occurs with such note objects and in order to appreciate the associated programmatic actions, it is helpful to review an example drag-and-drop operation with a note object. Microsoft OLE 2.0 defines interfaces that facilitate drag-and-drop operations of objects across container boundaries. An application registers its window to be a target of a drag-and-drop operation by calling the RegisterDragDrop( ) function. The object to which a note object is to be attached must support the IDropTarget interface. This interface provides a number of functions that facilitate the object acting as a drop target. The source of the note object must support the IDropSource interface, which facilitates the object acting as the source of a drag-and-drop operation.

FIG. 5 shows an example of objects that may play a role in the drag-and-drop operation for a note object. In one embodiment of the present invention, a virtual desktop 60 includes a notepad object 62. The notepad object 62 serves as the vehicle for accessing the resources of the central notes facility 25. An application window 64 is provided by an application program 24. In the example described below, a user wishes to drag a note window generated at the notepad 62 to the application window 64 and to drop the note window into a document that is visible in the application window.

Figure 6:
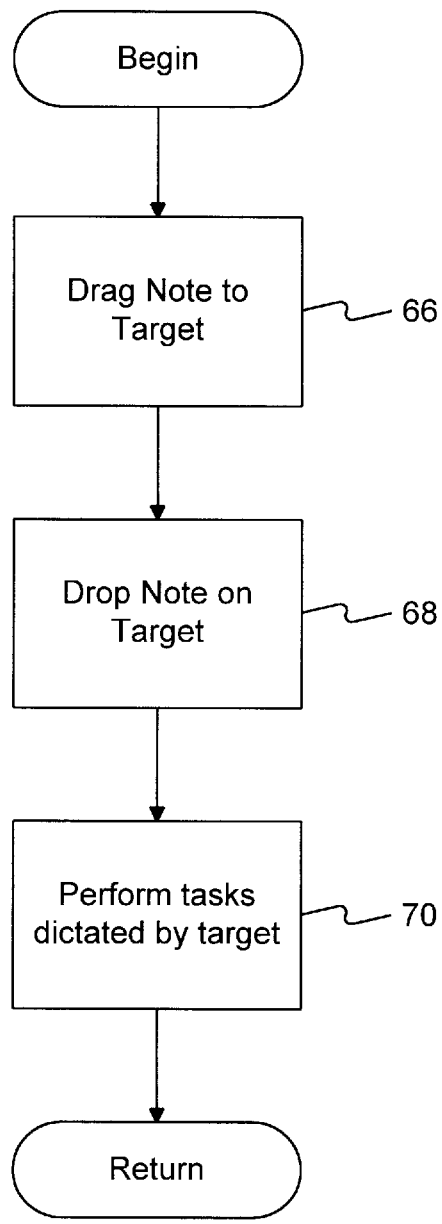
FIG. 6 of the flowchart illustrates the steps performed during a drag and drop operation of a note object in the preferred embodiment of the present invention.

FIG. 6 shows a flowchart of the steps that are performed during a drag-and-drop operation for a note object. The steps depicted within this flowchart will be described in conjunction with the diagram of FIG. 7. This example assumes that a note object, having corresponding note window 67, has already been created at the notepad 62. A user then positions mouse cursor 74 to point within the title bar 69 of the note window 67. The user depresses a button on the mouse 14 and drags the note window 67 to its intended target (step 66 in FIG. 6). In this example, the target is a document that is shown in the document window 71 of a word processor application window 68. Once the note window 67 is positioned over the intended location within the document, the note window is dropped by releasing the button on the mouse 14 (step 68 in FIG. 7). At this juncture, a negotiation occurs between the source of the drag-and-drop and the target of the drag-and-drop. The semantics of the drop operation are determined by the target. In this case, the word processor application program determines the effect of the drop operation of the note window within the document window 71. The word processor application program simply anchors the note at a negotiated position within the document. In other instances, however, the semantics may be different. For instance, if a note object containing a telephone number is dropped on a telephone icon, the program responsible for the telephone icon may cause the telephone number to be dialed. Those skilled in the art will appreciate that other functionality may be realized in similar fashion.

Figure 7:
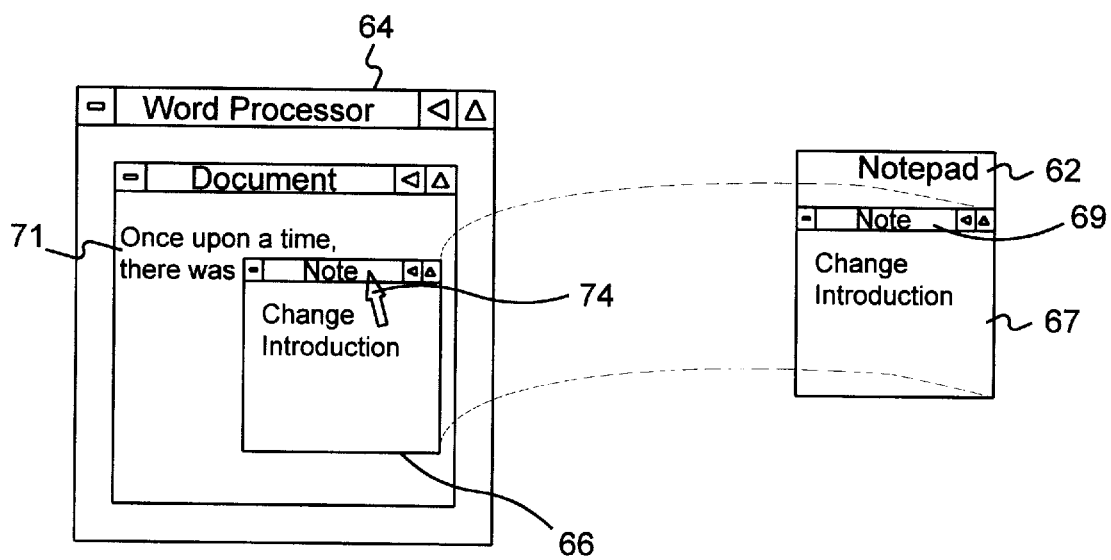
FIG. 7 illustrates a drag and drop operation from a note pad to a document in accordance with the preferred embodiment of the present invention.
Figure 8:
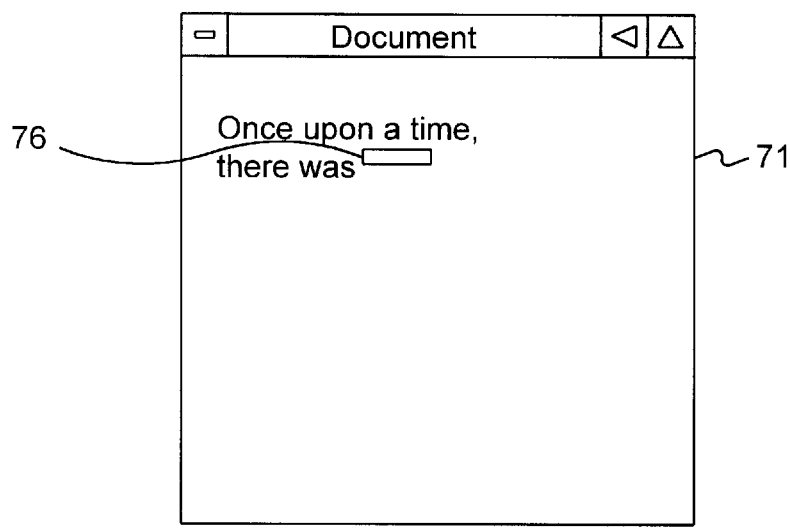
FIG. 8 illustrates a note object shown in iconic or collapsed form in accordance with the preferred embodiment of the present invention.

In the example of FIG. 7, the note window 67 is shown to be anchored within the document in expanded form. It should be appreciated that the note may also appear in a collapsed form, such as shown in FIG. 8. In particular, an iconic representation 76 of the note object may appear within the document window 71. This collapsed representation occupies less space within the document window 71 while still providing a clear indication that a note object is anchored at the associated location of the icon. The note object maintains state information that specifies whether it is to be displayed in collapsed or expanded form.

Those skilled in the art will appreciate that note objects may be attached to other objects using other mechanisms, including explicit commands. The drag-and-drop operation is intended to be merely illustrative and not limiting in scope of the present invention.

Figure 9:
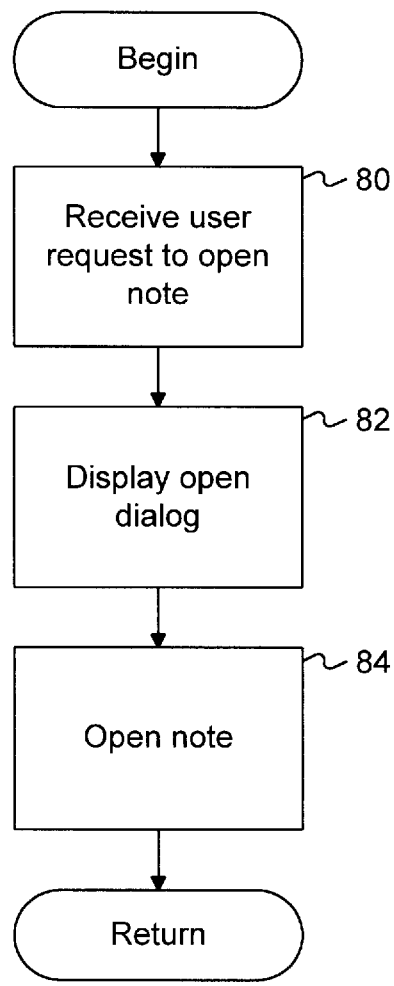
FIG. 9 is a flowchart illustrating the steps performed to open a note window in the preferred embodiment of the present invention.

Other operations that may be performed on note objects once they have been created, including opening note windows and closing note windows. FIG. 9 shows a flowchart of the steps that occur to open a note window 38. Initially, a request to open a note window 38 is generated and this request is received by the central notes facility 25 (step 80 in FIG. 9). A user may request to open a note window 38 by double clicking with the mouse when the mouse cursor points to a closed iconic representation 76 of a note object. Alternatively, a note window 38 may be opened by accessing the drop down menu 36 (FIG. 2) and selecting the "Open Note" option. Still further, a note window 38 may be opened as part of a request by user to open all of the notes by selecting the "Open All Notes" option on the drop down menu 36.

Figure 10:
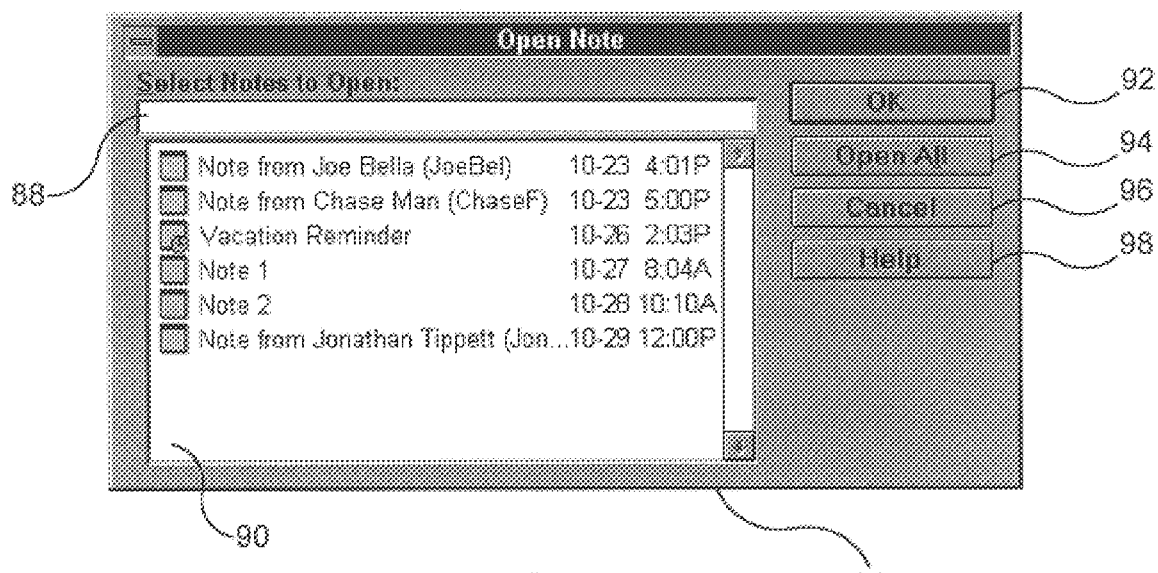
FIG. 10 illustrates an open note dialog used in the preferred embodiment of the present invention.

When the user selects the "Open Note" option from the drop down menu 36, the "Open Note" dialog 86 shown in FIG. 10 is displayed (step 82). The "Open Note" dialog 86 includes an edit box 88 to which a user may enter the name of a note to be opened. The user may also select a note window to open by selecting one or more notes from the list shown in the list box 90 of the "Open Note" dialog 86. Once the user has made a selection, the selection may be opened by hitting an OK button 92 that is provided in the dialog box 86 and the note window is opened (step 84). The user may instead open all of the notes shown in the list box by activating the "Open All" button 94. The user may exit the dialog by hitting the "Cancel" button 96 and may receive help information by activating the "Help" button 98. Opening a note causes a window for the note to be enlarged and for the window to gain focus.

Figure 11:
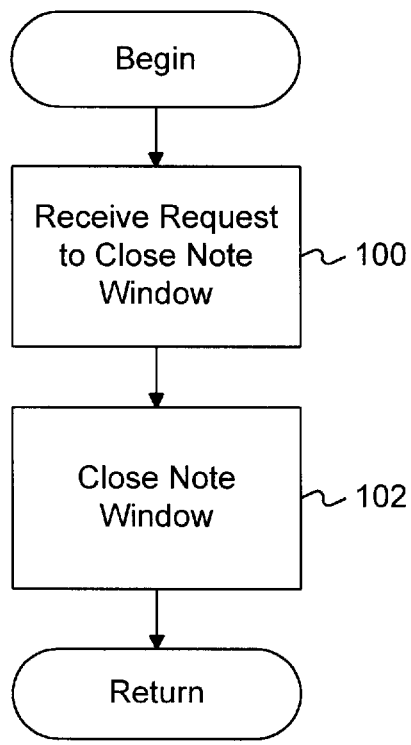
FIG. 11 illustrates the steps performed to close a note window in the preferred embodiment of the present invention.
Figure 12:
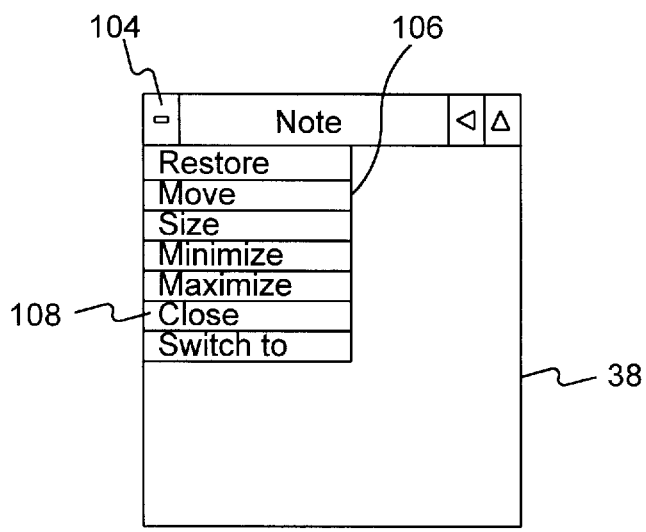
FIG. 12 illustrates a system menu that may be used to close a note window in the preferred embodiment of the present invention.

Options are also provided to close note windows. A note window 38 is closed by first receiving a request to close the note window (step 100 in FIG. 11) and then closing the note window in response to the request (step 102). One way of making such a request to close a note window 38 is to activate a system menu 106 (FIG. 12) via button 104 and selecting the "close" option 108. Alternatively, a note window may be closed as part of an operation that is responsive to the user selecting the "Close All Notes" option in the drop down menu 36 (FIG. 2). When a note window 38 is closed, it is shown in a minimized form (i.e., as an iconic representation 76) and the contents of the note are not directly accessible. In contrast, when a note window 38 is opened, it contents are accessible.

A note object may be deleted like any other object within the data processing system 10. The operating system 26 provides facilities for deleting such objects. A note object may also be moved by repeating the drag and drop operation to a new location. Programmatically, such a move involves removing the note object from the container object in which it was embedded and embedding it within a new object or, alternatively, at a new location within the object in which it is currently embedded.

Figure 13:
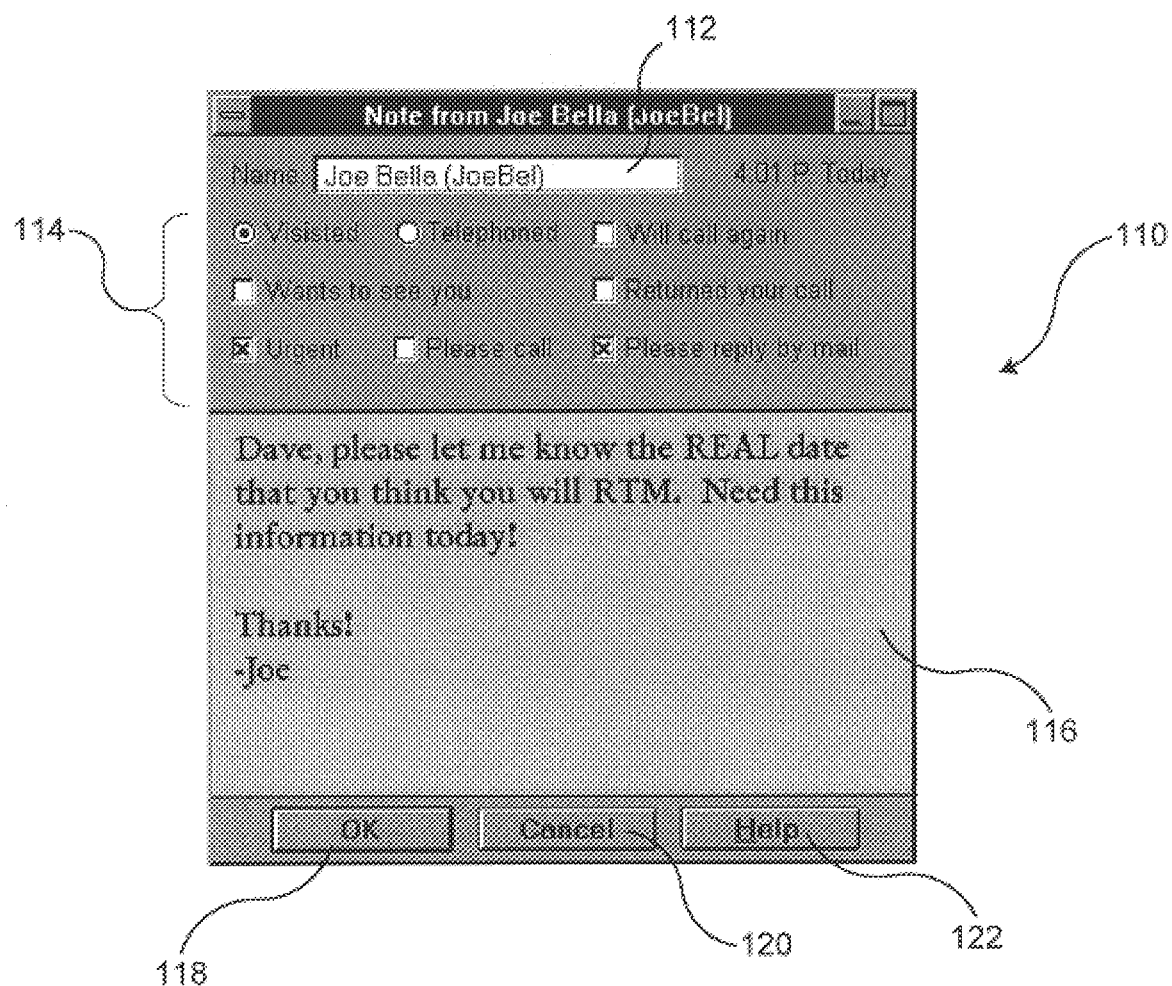
FIG. 13 illustrates the format of a note window in a screen saver program in accordance with the preferred embodiment of the present invention.

In accordance with one embodiment of the present invention, the central notes facility 25 may be accessible from within a screen saver application program. The screen saver application allows a third party to leave a note at a user's computer when the screen saver is activated. The screen saver may include a moving marquee display to let a visiting third party know that they may leave a message on the user's computer. The default trigger for leaving a message is for the visiting third party to hit the "enter" key. When the user presses the "enter" key, they are presented with the note-taker user interface 110 as shown in FIG. 13. The note-taker user interface includes an edit box 112 for a user to enter his name or the name of a calling party that has phoned the user. The note-taker user interface 110 also includes a number of check and option boxes 114 that specify information about the note. A client area 116 is included in the note-taker user interface 110 to enable the visiting third party to enter text or other information that will be incorporated as part of the note. An "OK" button 118 may be activated to accept the note. A "CANCEL" button 120 is provided for the third party to cancel a note and a "HELP" button 122 is provided to provide help information about the note taker interface.

Figure 14:
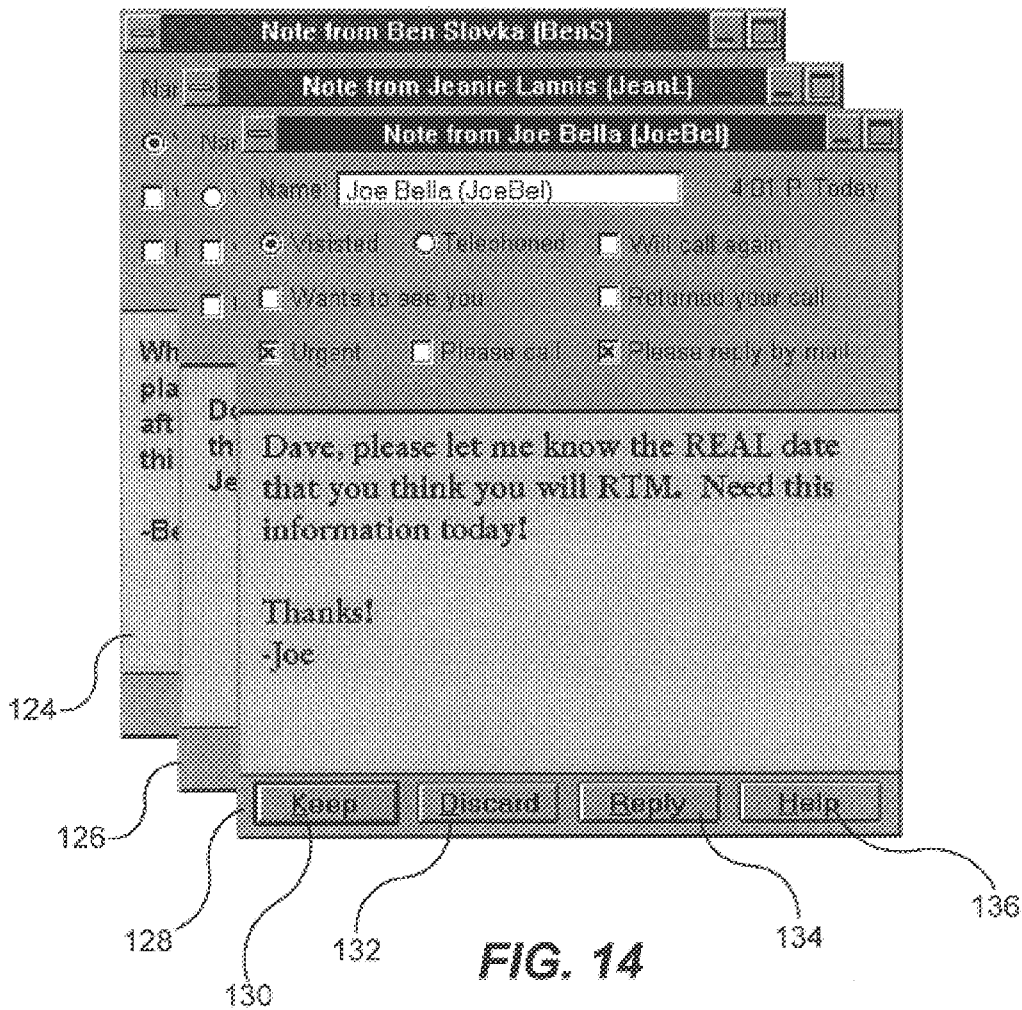
FIG. 14 illustrates a cascade of note windows used in a screen saver program in the preferred embodiment of the present invention.

When the user returns to his system 10, the user may gain access to the system (assuming it is not protected with a password) by moving the mouse 14 or pressing any key other than the "enter" key on the keyboard 16. Where the screen saver is protected with the password, a password dialog will be presented when the user moves the mouse or hits the keys. If a password authentication fails, the user is returned to the screen saver. Where the password is successfully entered or where the screen saver is password protected, the user returns to see the desktop 40 and is presented with messages that have been left for the user. Messages are displayed in a cascaded stack as shown in FIG. 14. The example in FIG. 14 shows notes 124, 126 and 128 that have been left for the user. The user may quickly read each note and either keep or discard the note by pressing the "KEEP" button 130 or the "DISCARD" button 132, respectively. In addition, the user may reply to the note by pressing the "REPLY" button 134.

Figure 15:
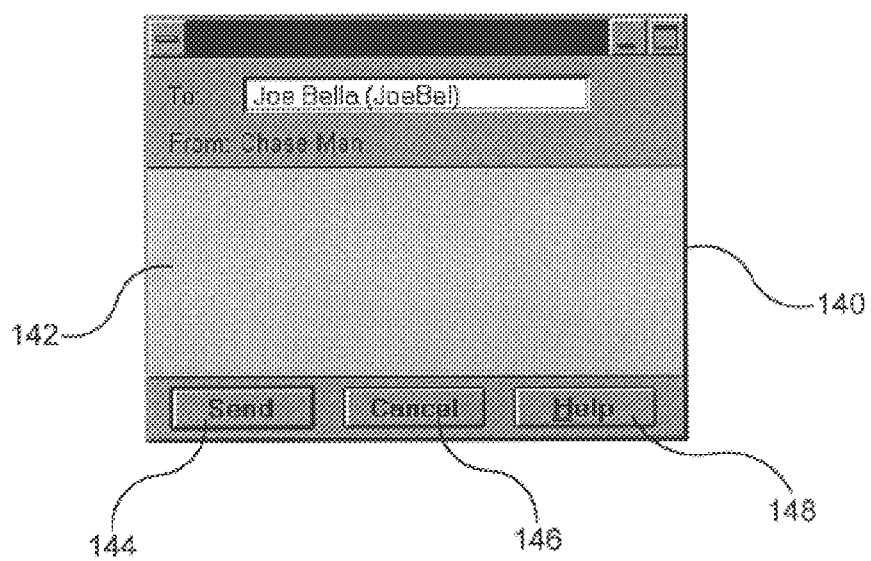
FIG. 15 shows an example of a reply window used by the screen saver program in the preferred embodiment of the present invention.

Pressing the "REPLY" button 134 generates a note 140 like that shown in FIG. 15. The user may enter information in the client area 142 and then send the resulting note by activating the "SEND" button 144. Alternatively, the user may cancel the sending note by pressing the "CANCEL" button 146 or obtain help information by activating the "HELP" button 148.

The user may also receive help information when reviewing the notes by activating "HELP" button 136 (FIG. 14). After a note is dismissed, the next note in the cascaded stack immediately pops to the foreground. Discarding notes cause a note to be closed and makes the note non-retrievable.

The central notes facility provides a vehicle for accessing all of the note objects that are currently stored within the system 10. Each object to which a note object is logically attached holds a property value that indicates that a note is present. This property value provides an easy vehicle for the central note facility to determine which objects have note objects logically attached to them. The property information may also specify additional information about each note that is connected to the object. Thus, the central note facility may provide a separate name space of note objects that may be accessed directly or via the objects to which they are attached.

Figure 16:
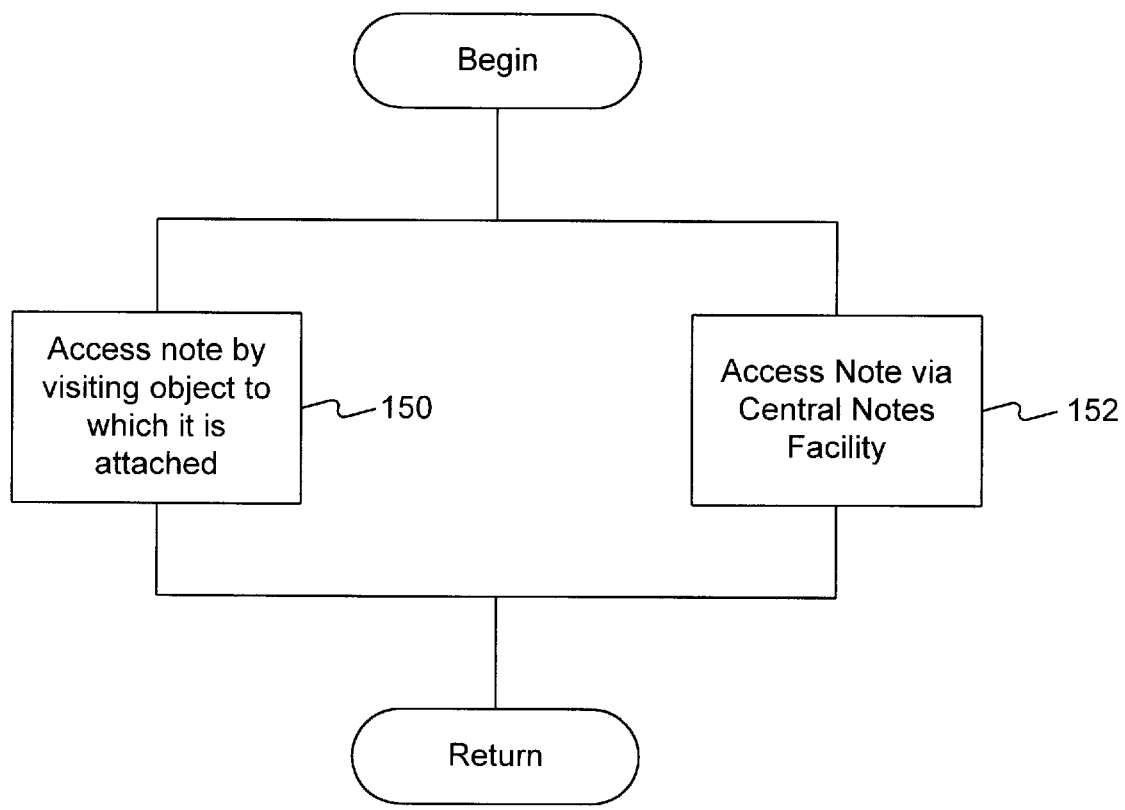
FIG. 16 illustrates a flowchart of alternative paths for accessing a note object in the preferred embodiment of the present invention.

As a result of storing information about note objects as property values on objects to which the note objects are attached, note objects may be accessed following two different paths. As shown in the flowchart of FIG. 16, a note object may be accessed by visiting the object to which it is attached (step 150). For instance, to visit a note that is attached to a word processing document, one may open the word processing document and view the portion of the document to which the note object is attached. Alternatively, the central notes facility 25 provides a vehicle for directly accessing note objects without the need of first visiting the object to which they are attached. Hence, the second alternative is to access the note via the central notes facility 25 (step 152 in FIG. 16).

As was discussed above, note windows may have preprinted forms. Central notes facility may generate note objects having preformatted contents added at the request of the user or program. The note window 110 shown in FIG. 13 for the screen saver program is an example of such a preformatted note. Edit box 112 and check and option boxes 114 constitute preformatted content, which the user may customize.

While the present invention has been described with reference to a preferred embodiment thereof, those skilled in the art will appreciate that various changes in form and detail may be made without departing from the intended scope of the present invention, as defined in the appended claims.

We claim:

1. In a computer system including a video display, a method for receiving notes while the computer system is in a screen-saver mode, comprising the steps of:

providing a screen saver program with a notes facility having a note-taker interface for generating notes;

in response to detecting an idle condition for a predetermined period of time, entering a limited-access mode limiting access within the computer system to the note-taker interface and during the limited-access mode, running the screen saver program, in response to receiving a first command for activating the note-taker interface, displaying the note taker interface on the video display, and in response to input by the user via the note taker interface, creating a note; and in response to receiving a second command for ending the limited-access mode, ending the limited-access mode, dismissing the screen saver program, and displaying the note on the video display.

2. The method of claim 1, further comprising the step of displaying information on the video display during the limited-access mode indicating that the note-taker interface may be activated by inputting the first command.

3. The method of claim 1, wherein the second command comprises entry of a password.

4. A computer-readable medium having computer-executable instructions for performing the steps of:

providing a screen saver program with a notes facility having a note-taker interface for generating notes;

in response to detecting an idle condition for a predetermined period of time, entering a limited-access mode limiting access within the computer system to the note-taker interface and during the limited-access mode, running the screen saver program, displaying information on the video display during the limited-access mode indicating that the note-taker interface may be activated by inputting a first command, in response to receiving the first command for activating the note-taker interface during the limited-access mode, displaying the note taker interface on the video display, and in response to input by the user via the note taker interface, creating a note; and in response to receiving a second command for ending the limited-access mode, ending the limited-access mode, dismissing the screen saver program, and displaying the note on the video display.

5. The computer-readable medium of claim 4, further comprising computer-executable instructions for performing the step of:

displaying information on the video display during the limited-access mode indicating that the note-taker interface may be activated by inputting the first command.

6. The computer-readable medium of claim 5, wherein the second command comprises entry of a password.

* * * * *